United States Patent
Williams et al.

(10) Patent No.: US 6,247,907 B1
(45) Date of Patent: Jun. 19, 2001

(54) THIN COUNTERWEIGHT FOR SEALED COMPRESSOR

(75) Inventors: John R. Williams; Tracy Milliff, both of Bristol, VA (US); Gene Michael Fields; Thomas Barito, both of Arkadelphia, AR (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/453,373

(22) Filed: Dec. 2, 1999

(51) Int. Cl.[7] .................................................... F04B 15/00
(52) U.S. Cl. ......................................... 417/410.5; 417/368
(58) Field of Search ................................ 417/410.5, 366, 417/368, 415, 372, 45, 53, 295, 310; 418/55.1, 55.6

(56) References Cited

U.S. PATENT DOCUMENTS

| | | | |
|---|---|---|---|
| 5,176,506 | * | 1/1993 | Siebel ..................................... 417/368 |
| 5,219,281 | * | 6/1993 | Caillat et al. ......................... 418/55.6 |
| 6,000,917 | * | 12/1999 | Smerud et al. ....................... 417/368 |

FOREIGN PATENT DOCUMENTS

08261165A * 10/1996 (JP) ................................ F04C/18/02

* cited by examiner

Primary Examiner—Teresa Walberg
Assistant Examiner—Quang Van
(74) Attorney, Agent, or Firm—Carlson, Gaskey & Olds

(57) ABSTRACT

A sealed compressor incorporates a relatively thin counterweight. The relatively thin counterweight is able to fit within a much smaller space than prior art cast counterweights. The relatively thin counterweight allows the reduction of the overall length of the sealed compressor, and thus provides very valuable benefits.

19 Claims, 2 Drawing Sheets

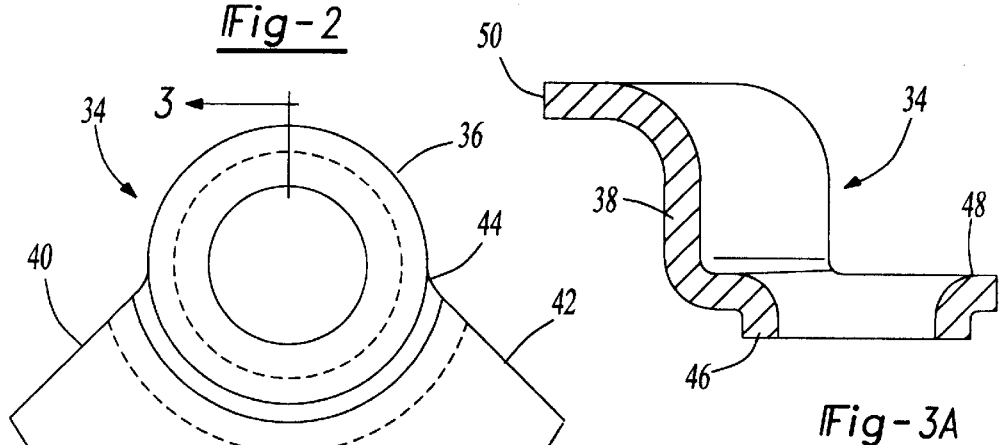
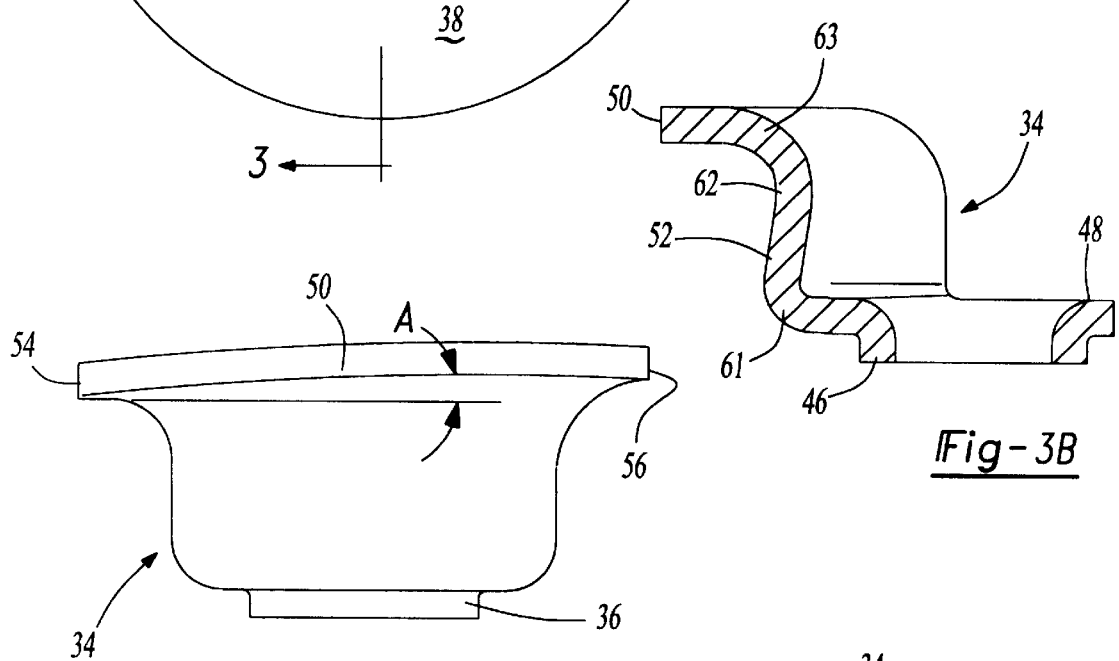
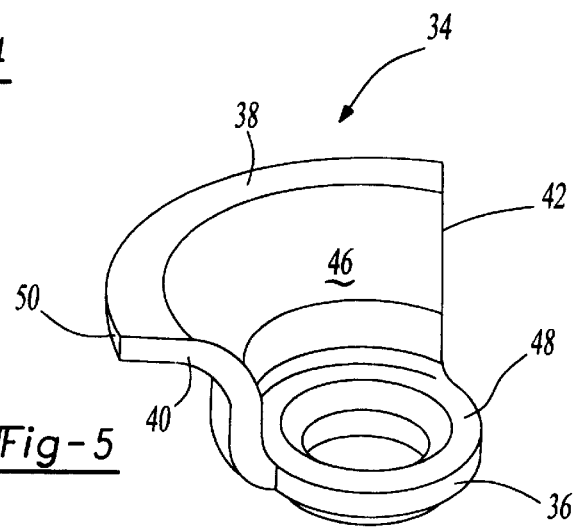

THIN COUNTERWEIGHT FOR SEALED COMPRESSOR

BACKGROUND OF THE INVENTION

This invention relates to an improved counterweight for a sealed compressor wherein the counterweight is relatively thin, allowing the entire sealed compressor housing to be made shorter.

Sealed compressors are utilized in many refrigerant compression applications. In such applications, a housing seals a compressor pump unit and a motor for driving the pump unit. Typically, the motor is maintained in a chamber which is at a suction pressure such that the motor is cooled. A shaft is driven by the motor to drive at least one element of the compressor pump unit.

In one very popular type of modern compressor, the pump unit consists of two relatively orbiting scroll members. In this type of compressor, known as a scroll compressor, first and second scroll members each have a base and a generally spiral wrap extending from the base. The spiral wraps interfit to define compression chambers. The shaft drives one of the scroll compressors to orbit relative to the other. As the two scroll members orbit, the size of the compression chambers is decreased to compress an entrapped refrigerant.

Historically, the counterweight has been contained within the geometry of the upper motor windings, and sandwiched between the crankcase and the motor stator.

A scroll compressor requires a counterweight be mounted onto the shaft. Historically, counterweights have been relatively large parts which extend for a relatively great area and axial length. It is important that a portion of the counterweight, and in particular its center of gravity, be positioned upwardly near to the orbiting scroll. This has resulted in an undesirable amount of space being required for the counterweight.

SUMMARY OF THE INVENTION

In the disclosed embodiment of this invention, the counterweight is a relatively thin part. In particular, the counterweight has a relatively small neck portion to be received on the shaft, and extending upwardly between the crankcase hub and the upper stator windings to a upper portion which is also relatively thin. The distance that the upper portion extends axially is preferably greater than two times the thickness of the upper portion and most preferably more than three times the thickness. More preferably, the distance is greater than five times the thickness of the upper portion. This relatively thin counterweight can thus fit into a relatively small amount of space. As will be shown in the drawings, this allows a dramatic decrease in the required axial length of the sealed compressor.

In other aspects of this invention, the use of the relatively thin counterweight allows the counterweight to be stamped. Once the counterweight is stamped, further features can be quickly provided by easily manipulating the structure of the counterweight. As an example, a back draft can be formed in the counterweight such that the upper portion is resistant to flow of lubricant upwardly along the outer edge of the counterweight.

Further, the upper edge can be formed to have an air foil angle that may be tailored to assist in oil or refrigerant circulation.

These and other features of the present invention can be best understood from the following specification and drawings, the following of which is a brief description.

BRIEF DESCRIPTION OF THE DRAWINGS

FIG. 2 is a top view of an inventive counterweight.

FIG. 3A is a cross-sectional view along line 3-3 as shown in FIG. 2.

FIG. 3B is an alternative embodiment.

FIG. 4 is an outer view of one portion of the inventive counterweight.

FIG. 5 is a perspective view of the inventive counterweight.

DETAILED DESCRIPTION OF A PREFERRED EMBODIMENT

Figure 1:
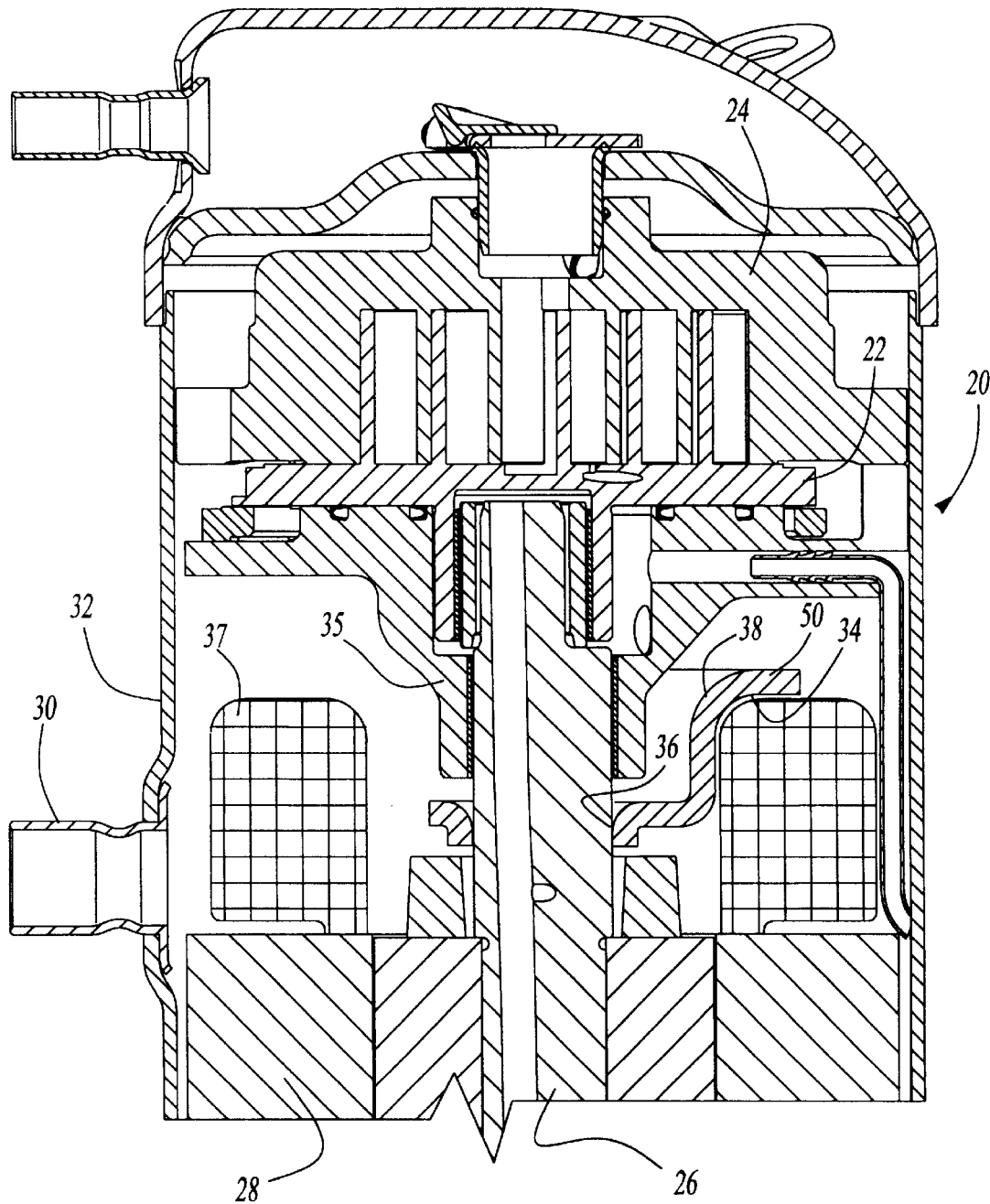
FIG. 1 is a cross-sectional view of a scroll compressor incorporated in the present invention.

A compressor 20 is illustrated in FIG. 1 having an orbiting scroll 22 and a fixed or non-orbiting scroll 24. As known, a shaft 26 drives the orbiting scroll 22 to orbit relative to the non-orbiting scroll. A motor 28 drives the shaft. The orbiting scroll is driven to orbit by the rotating shaft due to a coupling which causes orbiting movement.

A suction tube 30 extends into a housing 32 which seals the motor and scroll compressor. As shown in the drawing, one recent improvement to sealed compressors has been the movement of the suction tube 30 downwardly such that is axially aligned to the portion of the motor.

This invention provides the incorporation of the counterweight 34 such that it best utilizes the space available between a crankcase 35 which supports the shaft 26 and orbiting scroll 22, and the upper windings 37 of the motor 28. As can be appreciated from FIG. 1, the counterweight 34 is able to best utilize the space between the crankcase 35 and the windings 37, and is thus able to allow a dramatic decrease in the overall length of the compressor.

As can be appreciated from FIG. 1, along an axis defined by the rotation of shaft 26, the counterweight 34 has portions axially aligned with the windings 37, and with the crankcase 35.

The counterweight 34 has a neck portion 36 which is mounted on the shaft 26. Further, the counterweight has an upwardly extending portion 38. The upwardly extending portion 38 moves the center of gravity upwardly away from the neck portion 36. Thus, even though the counterweight is mounted downwardly within the length of the motor, the center of gravity is upward closer to the orbiting scroll 22, which is the source of imbalance. This allows a lower counterweight, which must balance the upper counterweight, to be made lighter. Thus, the entire counterweight system is of reduced weight.

As can be appreciated from FIG. 2, the counterweight 34 has its upper portion 38 extending between two circumferential ends 40 and 42. In the preferred embodiment, these ends are spaced by about 90 degrees. Further, a blend portion 44 is formed at an angle between the neck portion 36 and leading into the upper portion 38. A central bore 46 is fitted onto the shaft 26.

As one main benefit of the stamped thin metal counterweight of this invention, the bore 46 is able to have a loose dimension tolerance due to material ductility. The bore will yield as forced onto the shaft 26, and thus tight tolerance control is not necessary. This allows a dramatic reduction in cost.

As shown in FIG. 3A, the neck portion 36 has the downwardly extending portion 46 which is received on the shaft, and an outwardly extending ear portion 48. Ear portion 48 leads into the blend portion 44 as can be appreciated in FIG. 2. An outer edge 50 of the upper portion 38 is defined at the radially outermost and axially uppermost location of the counterweight. As can be appreciated from FIGS. 1 and 5, portion 50 extends radially outwardly above the motor windings 37.

As shown in an alternative embodiment 51 in FIG. 3B, a backdraft 52 may be formed on the upper portion 38. The backdraft 52 comprises a first section 61 extending radially outwardly and a section 62 extending back inwardly. An upper extreme 63 of upper portion 38 extends radially outwardly of section 62. The backdraft 52 will resist "crawling" or climbing of lubricant up the wall of the counterweight. This will better control lubricant flow. In another feature apparent from FIGS. 3A and 3B, the counterweight is relatively thin. As can be appreciated, the upper portion extends for a distance that is more than two and preferably three times the thickness of the upper portion. Further, more preferably, the upper portion extends for an axial length that is greater than five times the thickness of the upper portion. In one preferred embodiment, the upper portion extended axially for a distance that is 38.15 mm, while the upper portion had a thickness of 7.137 mm. The relatively thin counterweight is able to provide a very compact design that is able to fit within the tight space requirements of an axially height reduced compressor.

As shown in FIG. 4, in another feature, the outer edge 50 of the upper portion can be formed to create an air foil angle A. One end 54 of the outer edge 50 can be positioned downwardly relative to the opposed end 56. As shown, the edge does not extend along a straight line, but is preferably curved. During rotation, this air foil angle will control the flow of fluids within the sealed compressor. The air flow angle can be utilized to improve gas and oil circulation, or to control suction gas flow.

The counterweight is preferably stamped from a suitable metal, and preferably from steel.

A preferred embodiment of this invention has been disclosed, however, a worker in this art would recognize that certain modifications would come within the scope of this invention. For that reason, the following claims should be studied to determine the true scope and content of this invention.

What is claimed is:

1. A compressor comprising:
   a compressor pump unit mounted at one end;
   a motor for driving said compressor pump unit, said motor driving a shaft, said shaft being mounted to drive at least a portion of said compressor pump unit; and
   a counterweight mounted on said shaft, said counterweight being positioned between an upper edge of said motor and a lower edge of said compressor pump unit, said counterweight being relatively thin, and said counterweight having a neck portion mounted on said shaft, and an upper portion extending upwardly from said neck portion toward said compressor pump unit, said upper portion extending for less than 360° of circumference about a rotational axis of said shaft, and said upper portion extending axially from said neck portion for a length that is more than two times the thickness of said upper portion.

2. A compressor as recited in claim 1, wherein said upper portion extends for a length that is greater than five times the thickness of said neck portion.

3. A compressor as recited in claim 1, wherein said counterweight is formed as a stamped metal part.

4. A compressor as recited in claim 3, wherein said counterweight is formed of a steel.

5. A compressor as recited in claim 1, wherein said neck portion has a downwardly extending tubular portion to be received on a shaft and an outwardly extending ear portion, said outwardly extending ear portion merging into said upper portion.

6. A compressor as recited in claim 1, wherein said upper portion has a backdraft portion created by a portion of said upper portion curving radially outwardly from said neck portion, and then extending back radially inwardly, said backdraft portion resisting flow of lubricant within a housing receiving said compressor.

7. A compressor as recited in claim 6, wherein said upper portion including an outer edge extending radially outwardly from said radially inwardly extending portion.

8. A compressor as recited in claim 1, wherein said upper portion including a radially outermost edge extending radially outwardly from a portion of said upper portion extending generally axially.

9. A compressor as recited in claim 8, wherein said outer edge provides an air foil by being formed to extend about an angle toward one axial direction such that an air foil is created.

10. A compressor as recited in claim 8, wherein said outer edge extends radially over stator windings of said motor.

11. A compressor as recited in claim 1, wherein said compressor pump unit is a scroll compressor comprising first and second scroll members each having a base and a generally spiral wrap extending from said base.

12. A compressor comprising:
   a compressor pump unit comprising first and second scroll members, each of said first and second scroll members having a base and generally spiral wrap extending from said base, said second scroll member being caused to orbit relative to said first scroll member, and said wraps interfitting to define compression chambers;
   a motor for driving said second scroll member, said motor driving a shaft, said shaft driving said second scroll member; and
   a counterweight mounted on said shaft, said counterweight being positioned between upper edge of said motor and a lower edge of said compressor pump unit, said counterweight being relatively thin, and said counterweight having a neck portion mounted on said shaft, and an upper portion extending upwardly from said neck portion toward said compressor pump unit, said upper portion extending for less than 360° of circumference about a rotational axis of said shaft, and said upper portion extending axially from said neck portion for a length that is more than three times the thickness of said upper portion.

13. A compressor as recited in claim 12, wherein said upper portion extends for a length that is greater than five times the thickness of said neck portion.

14. A compressor as recited in claim 12, wherein said counterweight is formed as a stamped metal part.

15. A compressor as recited in claim 12, wherein said neck portion has a downwardly extending tubular portion to be received on a shaft and an outwardly extending ear portion, said outwardly extending ear portion merging into said upper portion.

16. A compressor as recited in claim 12, wherein said upper portion has a backdraft portion created by a portion of said upper portion curving radially outwardly from said neck portion, and then extending back radially inwardly, said backdraft portion resisting flow of lubricant within a housing receiving said compressor.

17. A compressor as recited in claim 16, wherein said upper portion including an outer edge extending radially outwardly from said radially inwardly extending portion.

18. A compressor as recited in claim 12, wherein said upper portion including a radially outermost edge extending radially outwardly from a portion of said upper portion extending generally axially.

19. A compressor as recited in claim 18, wherein said outer edge provides an air foil by being formed to extend about an angle toward one axial direction such that an air foil is created.

* * * * *